(12) United States Patent
Lee et al.

(10) Patent No.: US 7,330,182 B2
(45) Date of Patent: Feb. 12, 2008

(54) 3D GRAPHICS PROCESSING METHOD

(75) Inventors: Ruen-Rone Lee, Taipei (TW);
Cai-Sheng Wang, Taipei (TW);
Yu-Chang Wang, Taipei (TW)

(73) Assignee: Via Technologies, Inc., Shindian, Taipei (TW)

( * ) Notice: Subject to any disclaimer, the term of this patent is extended or adjusted under 35 U.S.C. 154(b) by 227 days.

(21) Appl. No.: 11/031,393

(22) Filed: Jan. 7, 2005

(65) Prior Publication Data

US 2005/0156927 A1 Jul. 21, 2005

(30) Foreign Application Priority Data

Jan. 16, 2004 (TW) .............. 93101263 A

(51) Int. Cl.
*G06T 15/00* (2006.01)
(52) U.S. Cl. .............. 345/421; 345/427; 345/629
(58) Field of Classification Search .............. 345/422, 345/419, 421, 627, 629, 427, 428
See application file for complete search history.

(56) References Cited

U.S. PATENT DOCUMENTS 4,888,712 A * 12/1989 Barkans et al. .............. 345/627
6,774,895 B1 * 8/2004 Papakipos et al. .......... 345/422
6,864,893 B2 * 3/2005 Zatz .......................... 345/503

OTHER PUBLICATIONS

Olano et al., Triangle Scan Conversion using 2D Homogeneous Coordinates, ACM, 1997, pp. 89-95.*

* cited by examiner

*Primary Examiner*—Phu K. Nguyen
(74) *Attorney, Agent, or Firm*—Kirton & McConkie; Evan R. Witt

(57) ABSTRACT

A 3D-graphics processing method for processing 3D objects in a computer system defines a visible region having a far plane and a near plane. A clipping process is performed for a first object lying across the near plane while a second object lying across the far plane is exempted from the clipping process. In stead, the second object is performed with a rendering process as a whole to obtain a plurality of pixels. The depth values of the pixels are then compared with a depth value of the far plane. For any of the pixels having a depth value greater than the depth value of the far plane, it is discarded from display. On the other hand, any of the pixels of the first object not blocked by other pixels in front thereof and having a depth value smaller than the depth value of the far plane is outputted for display.

16 Claims, 7 Drawing Sheets

3D GRAPHICS PROCESSING METHOD

FIELD OF THE INVENTION

The present invention relates to a three-dimensional (3D) graphics processing method, and more particularly to a 3D-graphics clipping process implemented with a computer system.

BACKGROUND OF THE INVENTION

In 3D computer graphics, the image of an object is projected onto a projection plane and then recorded into a display memory so as to be able to show a 3D-graphics on a planar display. Please refer to FIG. 1A, in which a visible region 10 is defined in a view extending from an original 11 in a specified direction and confined within points 121, 122, 123, 124, 131, 132, 133 and 134. The objects in the visible region are to be projected onto a projection plane that is generally the near plane 101 confined within the points 121, 122, 123 and 124. At a time point, some of the objects are completely located inside the visible region 10, e.g. objects 141 and 142, some are completely located outside the visible region 10, e.g. object 143, and the others are located across the margin of the visible region 10, e.g. object 144. Conventionally, the object 144 intersecting with the visible region 10 is disregarded from the projecting operation just like the object 143 completely located outside the visible region 10. Such an algorithm is simple but adverse to smoothness of images. For example, during the period when the object 144 continuously intersects with the visible region 10, the object 144 has been keeping disregarded. Once the object 144 completely enters the visible region 10 at a certain time point, the object 144 will become visible and thus processed to be shown on the display. Under this circumstance, the object 144 seems to jump into the frame suddenly. On the other hand, for the object 141 or 142 that is shown in the display at a previous time point, it seems to disappear from the display suddenly once a little corner thereof moves out of the margin of the visible region 10. If there are a great number of objects simultaneously jumping in or jumping out of the display, the smoothness of images will be adversely affected.

For solving this problem, a 3D-graphics clipping process is developed. As is known to those skilled in the art, a 3D-graphics clipping process is generally a time-consuming task in the 3D image processing pipeline. There are six clipping planes based on to clip a polygon against the view volume. For each clipping plane, an intersection with the polygon is performed. For each intersection, new polygons must be determined based on the intersection points. Therefore, for an application involving hundreds of thousands of polygons, the clipping process will be one of the bottlenecks of the 3D image processing pipeline. Give the object 144 shown in FIG. 1A as an example and further refer to FIG. 1B. Being subjected to the clipping process, the object 144 is divided into two parts 144a and 144b by the plane 102 conforming to the plane defined with points 122, 123, 132 and 133. While the part 144a is located inside the visible region, the part 144b is located outside the visible region. One of the parts 144a and 144b can be considered as a new object. Since the two parts 144a and 144b are calculated separately and processed as different objects, the display of the part 144a will not be affected by the disappearance of the part 144b. Such a clipping process, although improving the smoothness of images, derives tremendous calculations. First of all, which objects need to be clipped has to be determined. Then, clipping planes cannot be realized until a series of calculations are performed for the object to be clipped. Afterwards, new operational points and associated lines and planes are generated after further calculations. Finally, all the calculated data have to be correlated to generate the new object 144a or 144b. In spite the new object 144a or 144b is smaller than the original object 144 in size, it does not mean the calculation associated with each divided part can be simplified compared to the whole object. For example, referring to FIG. 2A, a cubic object 20 is defined with 8 points (seven of them are visible and the other is hidden) and consisting of 12 triangles (six of them are visible and the others are hidden) as shown. Once one of the 8 corners is clipped, the divided object 21 would become defined with 10 points (nine of them are visible and the other is hidden) and consisting of 16 triangles (ten of them are visible and the others are hidden) as shown in FIG. 2B. The calculation associated with the divided object 21 thus becomes complicated compared to the original object 20. Complicated calculation consumes lots of the system resource. Moreover, the display of images may be lagged.

In order to enhance the processing efficiency and reducing cost, various techniques have been developed to deal with the clipping process. For example, a so-called "guardband clipping" process is widely adopted by defining a guardband range outside the clipping window. According to the guardband clipping process, the object that partially intersecting with the clipping window is processed with a fast pixel rasterization mechanism to remove the pixels outside the clipping window. Please refer to FIG. 3, in which a guardband applicable to four clipping planes 391, 392, 393 and 394 of a visible region is exemplified. The clipping planes 391, 392, 393 and 394, if referring to FIG. 1A, could be the plane defined with points 122, 132, 133 and 123, the plane defined with points 122, 121, 131 and 132, the plane defined with points 124, 121, 131 and 134, and the plane defined with points 123, 124, 134 and 133. In FIG. 3, the rectangular zone 30 represents the visible region, and the ring zone 31 surrounding the rectangular zone 30 represents the guardband. With the use of the guardband to perform the 3D-graphics clipping process, the object 33 completely located inside the visible region 30, of course, remains as a whole. The object 34 lying across the margin of the visible region 30 but not extending outside the guardband 31 is also kept unclipped and will be processed subsequently for rendering as a whole. For the objects 32, 35 and 36 completely located outside the visible region 30, they are discarded from processing. As for the object 37 extending over the visible region 30, guardband 31 and surrounding (outside the guardband), it will be subject to clipping. In this fashion, the count and frequency of clipping operations could be minimized.

However, as mentioned above, there are generally six clipping planes based on to clip a polygon against the view volume. In other words, in addition to the aforementioned four side clipping planes 391, 392, 393 and 394, the other two clipping planes, e.g. a near plane defined with points 121, 122, 123 and 124 and a far plane defined with points 131, 132, 133 and 134 as illustrated in FIG. 1A, have not been taken into considerations in the prior art. Thus, the balance between the smoothness of images and the reduction of clipping operations need be further sought.

SUMMARY OF THE INVENTION

Therefore, the present invention provides a 3D-graphics processing method capable of performing 3D-graphics image processing with the far and/or near plane.

The present invention relates to a 3D-graphics processing method for processing 3D objects in a computer system. The method comprises steps of: defining a visible region, the visible region having a far plane and a near plane; performing a rendering process for a first object among the 3D objects, which lies across the far plane, to obtain a plurality of pixels; comparing depth values of the pixels with a depth value of the far plane; and discarding any of the pixels having a depth value greater than the depth value of the far plane from display.

In an embodiment, the method further comprises a step of performing a clipping process for a second object among the 3D objects, which lies across the near plane, to obtain data of a first portion having depth values smaller than a depth value of the near plane and data of a second portion having depth values greater than the depth value of the near plane. The second portion is performed with a rendering process while the first portion is exempted from the rendering process. The resulting pixels associated with the second portion of the second object are then outputted for display after the rendering process. Any of the pixels of the first object having a depth value smaller than the depth value of the far plane is also outputted for display if they are not blocked by other pixels in front of them.

For example, the 3D objects are a plurality of polygons defined with primitive data.

The present invention also relates to a 3D-graphics processing method for processing 3D objects in a computer system, which comprising steps of: defining a visible region, the visible region having a far plane and a near plane; performing a rendering process for a first object among the 3D objects, which lies across the near plane, to obtain a plurality of pixels; comparing depth values of the pixels with a depth value of the near plane; and discarding any of the pixels having a depth value smaller than the depth value of the near plane from display. Preferably, any of the pixels having a depth value greater than the depth value of the near plane is outputted for display if they are not blocked by other pixels in front of them.

In an embodiment, the alternative method further comprises steps of performing a clipping process for a second object among the 3D objects, which lies across the far plane, to obtain data of a first portion having depth values smaller than a depth value of the far plane and data of a second portion having depth values greater than the depth value of the far plane; performing a rendering process for the first portion but exempting the second portion from the rendering process; and outputting the resulting pixels associated with the first portion of the second object for display after the rendering process.

The present invention further provides a 3D-graphics processing method for processing 3D objects in a computer system, which comprises steps of: defining a visible region, the visible region having a far plane and a near plane; performing a rendering process for a selected object which is at least partially in the visible region; and defining a visible depth on display (Zs) of each pixel of the selected object according to the following Z-conversion formula:

$$Zs=((Zf+e1)/((Zf+e1)-(Zn-e2)))*(1-((Zn-e2)/Z)),$$

where Z is an actual visible depth of the pixel of interest, Zf is a depth value of the far plane, Zn is a depth value of the near plane, e1 and e2 are modifying coefficients, and e1 and e2 are not equal to zero at the same time.

For example, e1=0 and e2>0; e1>0 and e2=0; or e1>0 and e2>0.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
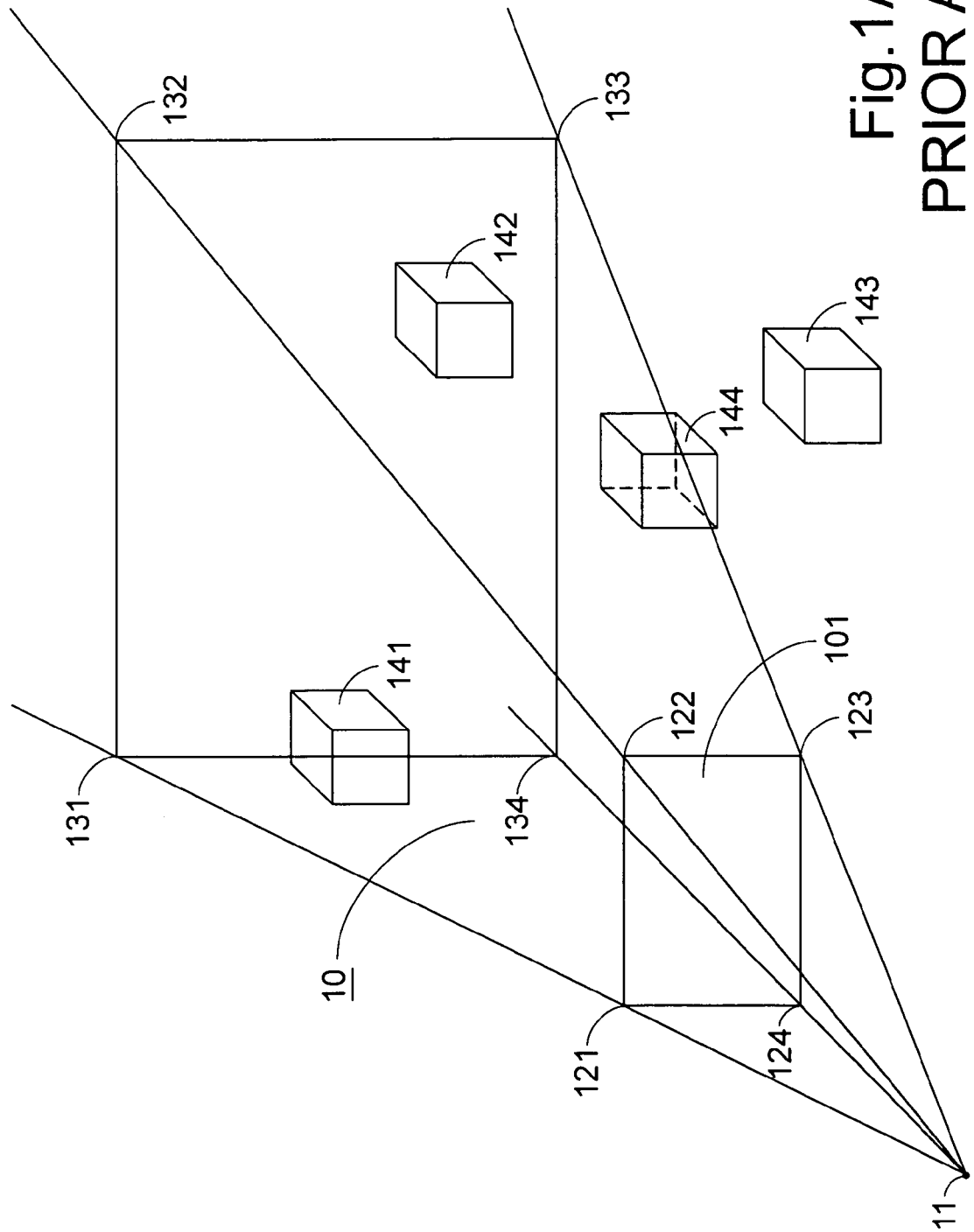
FIG. 1A is a schematic perspective diagram showing the objects to be processed with respect to a visible region.
Figure 1B:
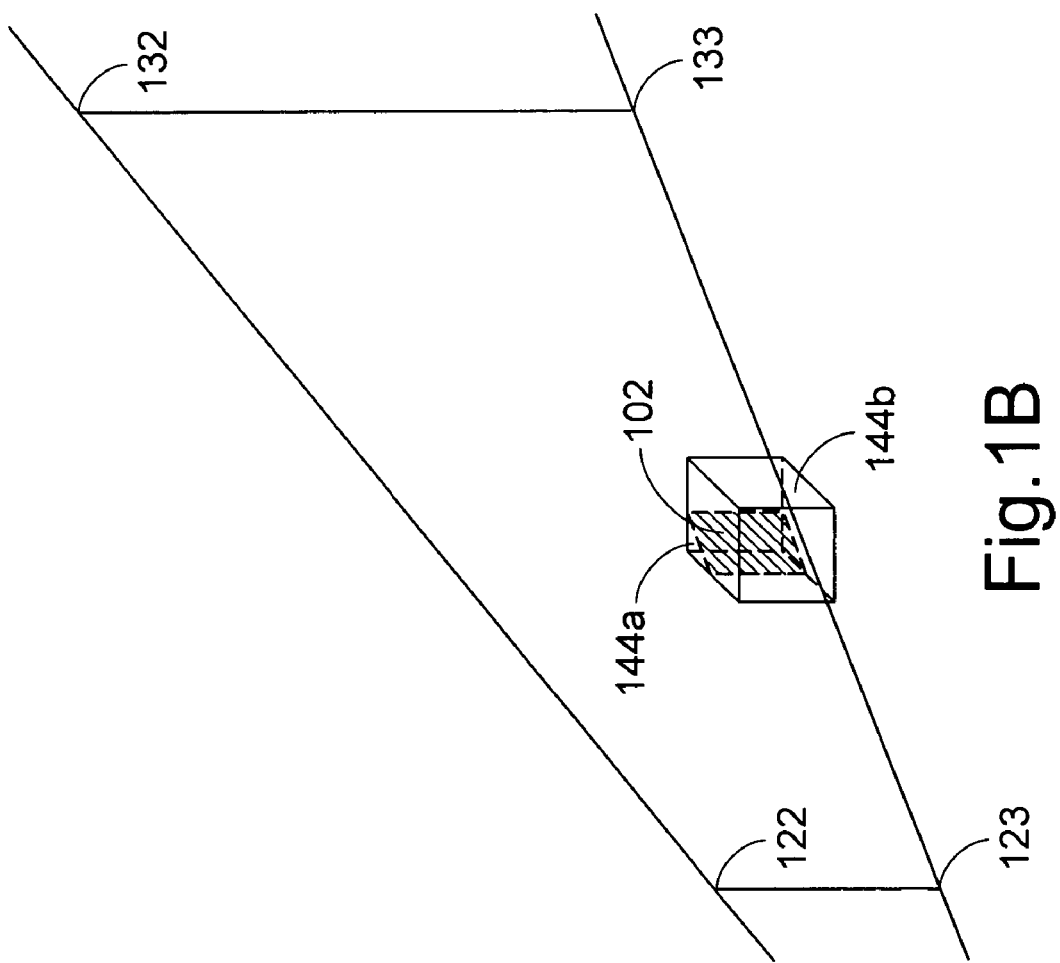
FIG. 1B is a schematic perspective diagram showing the object clipped with one of the side planes of the visible region in FIG. 1A according to prior art.
Figure 2B:
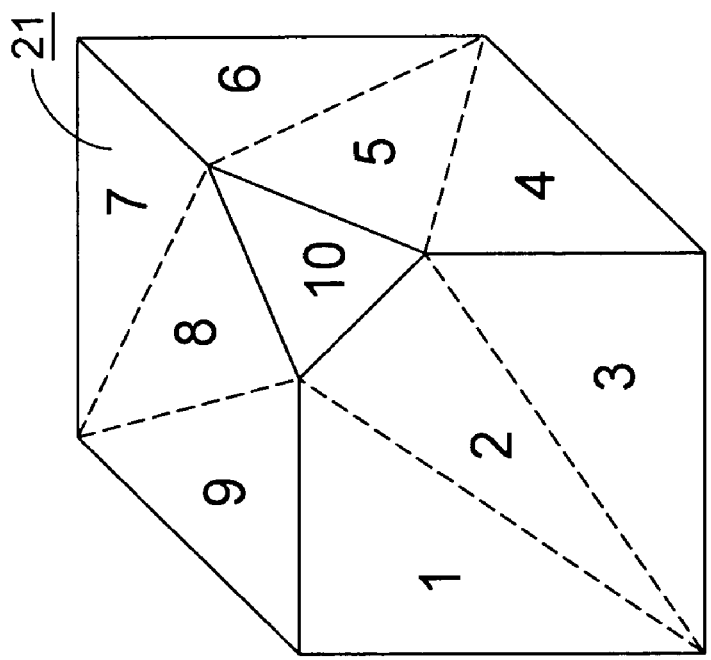
FIGS. 2A and 2B are schematic perspective diagrams illustrating how the polygon changes after cutting off a corner.
Figure 2A:
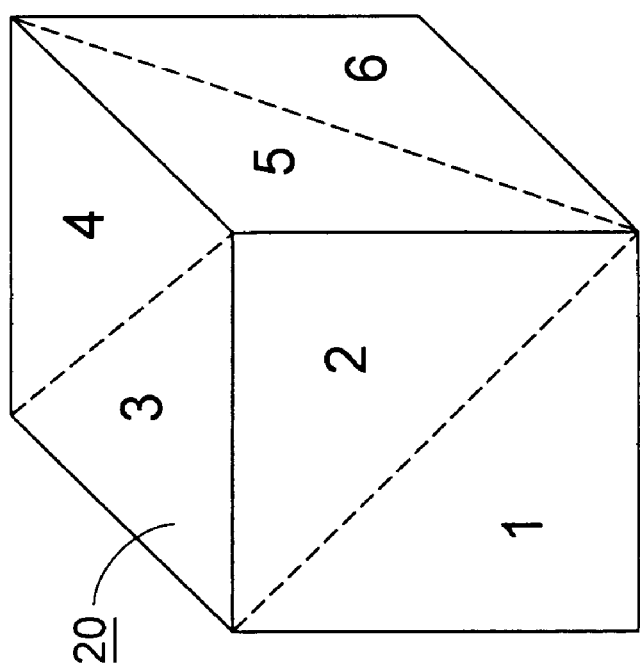
Figure 3:
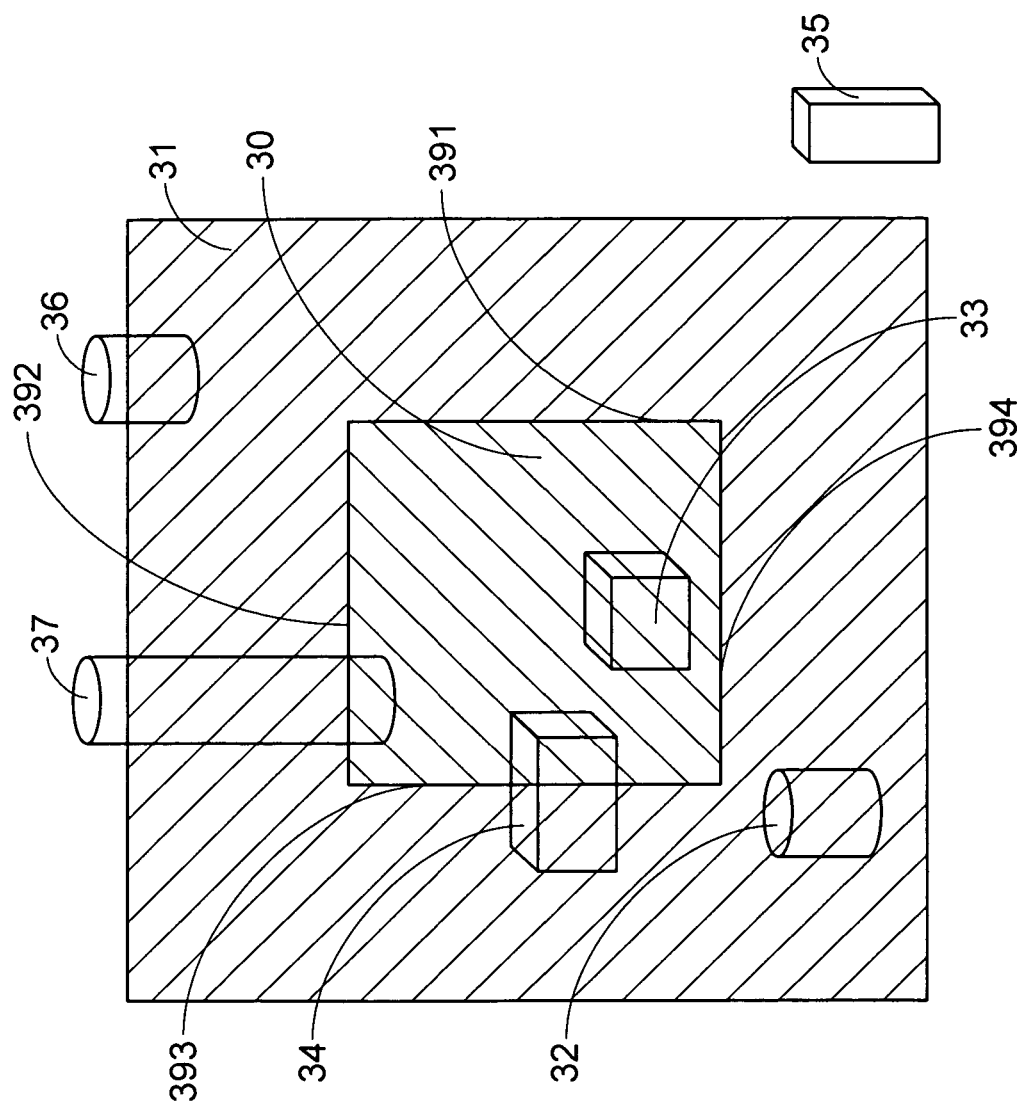
FIG. 3 is a schematic cross-sectional diagram showing the objects to be processed with respect to a visible region according to a conventional guardband method.
Figure 4:
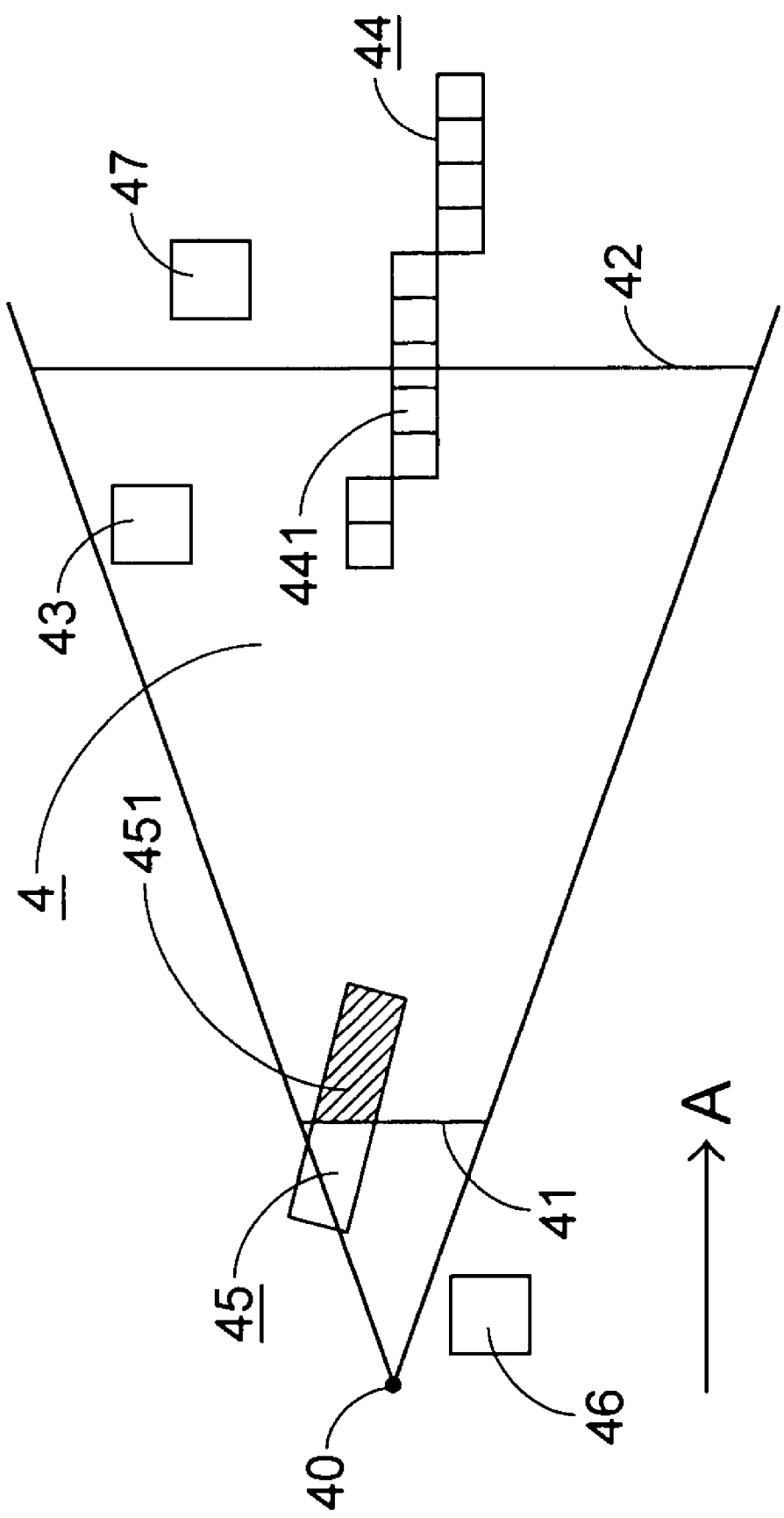
FIG. 4 is a schematic projected diagram showing the objects to be process with respect to a visible depth region according to an embodiment of the present invention.

In addition to the simple clipping process shown in FIG. 1, the guardband method shown in FIG. 3 or any other 3D-graphics image processing method with the four clipping planes, the present invention performs a 3D-graphics image processing method with the far and/or near planes. Like the visible region illustrated in FIG. 1A, the visible region exemplified for illustrating the embodiments of the present invention is defined by extending from an original in a specified direction and confined within a near plane, a far plane and four side planes. The objects described herein are three dimensional and configured as one or more polygons, for example. In order to clearly show the relationship between the objects and the far/near planes, a schematic diagram in which the objects and the visible region are projected on a plane is shown in FIG. 4. The projected visible region is defined as a visible depth region with a near end and a far end.

Please refer to FIG. 4, in which the visible depth region 4 is defined in a view extending from an original 40 in a specified direction A and having a near end 41 and a far end 42. At a time point, some of the objects are completely located inside the visible depth region 4, e.g. object 43, some are completely located outside the visible depth region 4, e.g. objects 46 and 47, and the others lie across the near end 41 of the visible depth region 4, e.g. object 45, or lie across the far end 42, e.g. object 44. The primitive data of the polygonal objects are selectively subjected to the clipping process according to the present invention. In an embodiment, it is only the object 45 lying across the near end 41 of the visible depth region 4 being clipped, while the object 44 lying across the far end 42 of the visible depth region 4 remains unclipped. The clipped process of the object 45 can be any suitable clipping process adapted to the 3D-graphics processing in a computer system, and will not be redundantly described herein. After the clipping process, the portion of the object 45 having depth values smaller than the depth value of the near end 41 will be clipped off and thus exempted from the subsequent rendering process. On the other hand, the other portion of the object 45 having depth values no smaller than the depth value of the near end 41 will enter a rendering process, and the resulting pixels can be outputted for display.

The object 44 having partial depth values greater than the depth value of the far end 42, although remaining unclipped, is processed with calculating and comparing operations before being outputted for display. In other words, the primitive data of the object 44 and any other object across the far end 42 of the visible depth region 4 are directly enter the subsequent rendering process without clipping. The resulting pixels, before being outputted to the display of the computer system, are compared with the depth value of the far end 42 in advance to determine which of the pixels can be outputted for display and which of them should be discarded. For any of the pixels having a depth value greater than or equal to the far end 42, it is discarded and will not be shown on the display. On the other hand, for those pixels having depth values smaller than the far end 42, they can be outputted for display. In this way, the object 44 can be partially shown without clipping, and thus the adverse effect of the clipping process on the 3D-graphics image processing can be efficiently avoided.

In another embodiment, it is the object 44 across the far end 42 of the visible depth region 4 being clipped, while the object 45 across the near end 41 of the visible depth region 4 remains unclipped. Likewise, the object 45 is subjected to a clipping process but the object 44 is processed with calculating and comparing operations. The primitive data of the object 45 and any other object across the near end 41 of the visible depth region 4 are subjected to a subsequent rendering process without clipping. The resulting pixels, instead of direct output to the display of the computer system, are compared with the depth value of the near end 41 in advance to determine which of the pixels can be outputted for display and which of them should be discarded. For any pixel having a depth value smaller than or equal to the near end 41, it is discarded and will not be shown on the display. On the other hand, for those pixels having depth values greater than the near end 41, they can be outputted for display. In other words, the object 45 can be partially shown without clipping. Of course, it is also possible to process objects across both ends with aforementioned calculating and comparing operations. In this fashion, the adverse effect of the clipping process on the 3D-graphics image processing can be efficiently avoided.

Although the present invention suggests to process objects across either or both of the end planes with aforementioned calculating and comparing operations after the rendering process, it is more practical that the objects across the far plane are processed with the present calculating and comparing operations in current applications.

Figure 5:
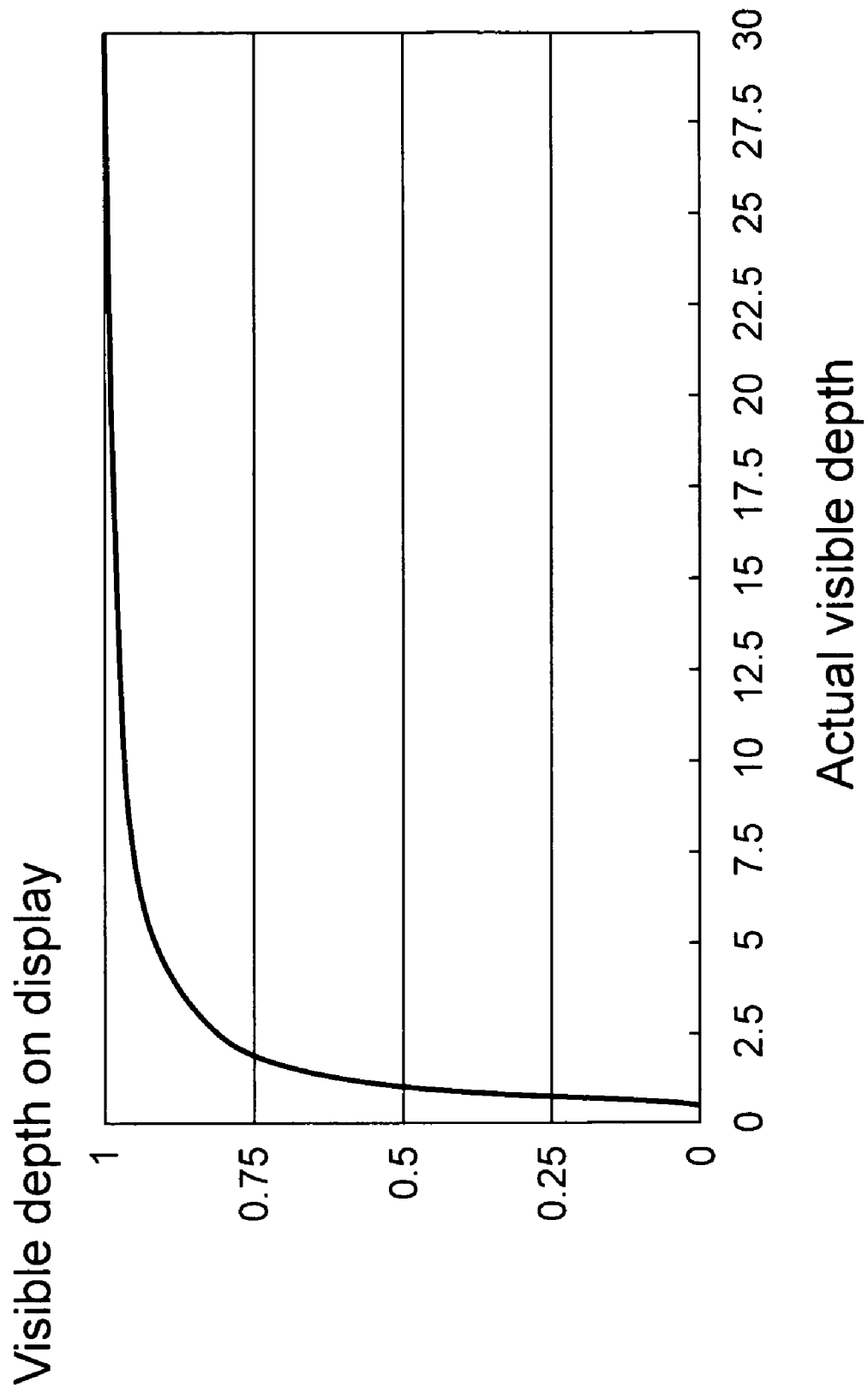
FIG. 5 is a plot illustrating the relationship between the visible depth on display and the actual visible depth.

In spite the present invention has efficiently minimized the adverse effect of the clipping process on the 3D-graphics image processing, the above embodiments can be further improved to avoid possible abnormal display. FIG. 5 is a plot illustrating the relationship between the visible depth on display and the actual visible depth. An actual visible depth ($Zc$) is converted into a visible depth on display ($Zs$) ranged between 0 and 1. The formula for conversion is so-called as Z-conversion and expressed as $Zs=Zc/Wc$, where Wc is a non-linear conversion parameter, and where $Zc=Zf(Z-Zn)/(Zf-Zn)$, and $Wc=Z$.

Figure 6A:
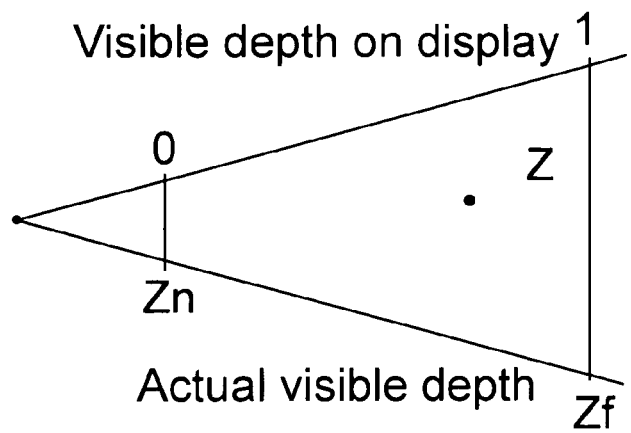
FIGS. 6A~6C are schematic diagrams showing the conversion settings between the visible depth on display and the actual visible depth according to three different embodiments of the present invention.

Thus, it is derived that $Zs=Zc/Wc=(Zf/(Zf-Zn))*(1-(Zn/Z))$, where Zf is the largest actual depth value in the visible region, Zn is the smallest actual depth value in the visible region, and Z is the actual depth value of the point of interest, as exemplified in FIG. 6A.

It is understood from the above formulae that for the near plane, the value Z can be set to be Zn, and thus the value Zs is equal to 0. On the other hand, for the far plane, the value Z can be set to be Zf, and thus the value Zs is equal to 1. As for the objects located within the visible range, i.e. between the near and far planes, the actual depth value Z thereof will lie between Zn and Zf and the display depth value Zs thereof is supposed to lie between 0 and 1. However, in the case that calculation precision is not as high as required, it is possible for the calculated displayed depth value Zs to erroneously become less than 0 or greater than 1. Accordingly, the nearest pixels or the farthest pixels are possibly undesirably discarded from display. Particularly, according to the plot of FIG. 5 and the above formulae, Zs changes dramatically for those objects close to the near plane but hardly changes for those objects close to the far plane. In other words, the farther the objects are away from the near plane, the less distinguishable the depths of the objects are on display. Therefore, the calculation precision at the far end is particularly critical. Once the unsatisfactory calculation precision results in the display depth value Zs erroneously greater than 1, the background would disappear from the display and the frame would become unnatural.

Figure 6B:
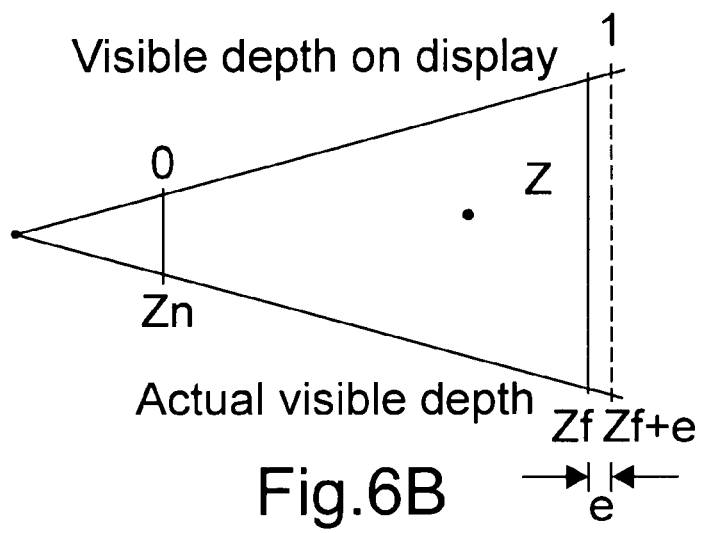

In order to avoid this possible defect, it is preferred to shift the largest actual depth value in the visible region to ($Zf+e$) in lieu of Zf, where e is a positive modifying coefficient, while setting the value Z of the far plane as Zf, as shown in FIG. 6B. Accordingly, the Z-conversion formulae will become expressed as $Zc=(Zf+e)(Z-Zn)/(Zf+e-Zn)$, $Wc=Z$, and $Zs=Zc/Wc((Zf+e)/((Zf+e)-Zn))*(1-(Zn/Z))$.

By this way, the largest depth value Zs on display will be slightly smaller than the threshold value 1. Therefore, the background-associated pixels can be assured of lying inside the visible region to be successfully displayed.

Figure 6C:
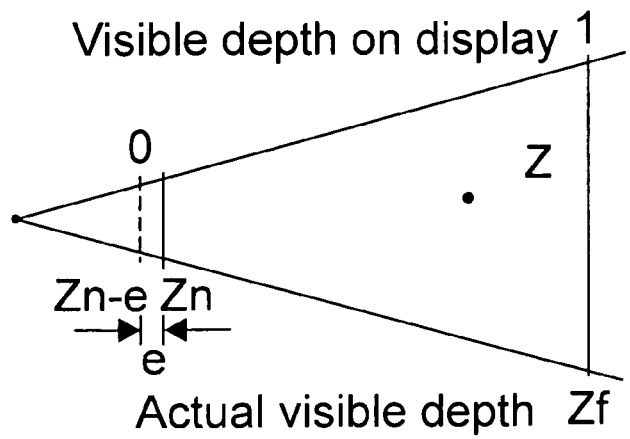

Likewise, in order to avoid the nearest pixels being undesirably discarded due to low calculation precision, the smallest actual depth value in the visible region can be shifted to ($Zn-e$) in lieu of Zn, where e is a positive modifying coefficient, while setting the value Z of the near plane as Zn, as shown in FIG. 6C. Accordingly, the Z-conversion formulae will become expressed as $$Zc=Zf(Z-(Zn-e))/(Zf-(Zn-e)),$$

$$Wc=Z, \text{ and}$$

$$Zs=Zc/Wc=(Zf/(Zf-(Zn-e))*(1-((Zn-e)/Z)).$$

By this way, the smallest depth value Zs on display will be slightly greater than the threshold value 0. Therefore, the front pixels can be assured of lying inside the visible region to be successfully displayed.

Of course, it is also possible to adjust the boundary values of both near and far ends so that the Z-conversion formulae become expressed as $$Zc=(Zf+e1)(Z-(Zn-e2))/((Zf+e1)-(Zn-e2)),$$

$$Wc=Z, \text{ and}$$

$$Zs=Zc/Wc=((Zf+e1)/((Zf+e1)-(Zn-e2))*(1-((Zn-e2)/Z)),$$

where e1 and e2 are positive modifying coefficients and can be equal or different.

According to the 3D-graphics image processing method of the present invention, the objects, if necessary, can be processed with the near and far planes. Further, direct rendering of selected objects followed by calculating and comparing operations with one or both of the far and near planes are executed instead of the clipping process so as to minimize the adverse effect of the clipping process on the 3D-graphics image processing.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A 3D-graphics processing method for processing 3D objects in a computer system, comprising steps of:
    defining a visible region, said visible region having a far plane and a near plane;
    performing a rendering process for a first object among said 3D objects, which lies across said far plane, to obtain a plurality of pixels;
    comparing depth values of said pixels with a depth value of said far plane; and
    discarding any of said pixels having a depth value greater than said depth value of said far plane from display;
    wherein a visible depth on display (Zs) of a pixel in said visible region is defined according to the following Z-conversion formula:

$$Zs=((Zf+e)/((Zf+e)-Zn))*(1-(Zn/Z)),$$

where Z is an actual visible depth of said pixel, Zf is said depth value of said far plane, Zn is said depth value of said near plane, and e is a positive modifying coefficient.

2. The method according to claim 1 further comprising a step of performing a clipping process for a second object among said 3D objects, which lies across said near plane, to obtain data of a first portion having depth values smaller than a depth value of said near plane and data of a second portion having depth values greater than said depth value of said near plane.

3. The method according to claim 2 further comprising a step of performing a rendering process for said second portion but exempting said first portion from said rendering process.

4. The method according to claim 3 further comprising a step of outputting the resulting pixels associated with said second portion of said second object for display after said rendering process.

5. The method according to claim 1 further comprising a step of outputting said pixels of said first object not blocked by other pixels in front thereof and having a depth value smaller than said depth value of said far plane for display.

6. The method according to claim 1 wherein said first object is performed with said rendering process as a whole.

7. The method according to claim 1 wherein said 3D objects are a plurality of polygons defined with primitive data.

8. A 3D-graphics processing method for processing 3D objects in a computer system, comprising steps of:
    defining a visible region, said visible region having a far plane and a near plane;
    performing a rendering process for a first object among said 3D objects, which lies across said near plane, to obtain a plurality of pixels;
    comparing depth values of said pixels with a depth value of said near plane; and
    discarding any of said pixels having a depth value smaller than said depth value of said near plane from display;
    wherein a visible depth on display (Zs) of a pixel in said visible region is defined according to the following Z-conversion formula:

$$Zs=(Zf/(Zf-(Zn-e))*(1-((Zn-e)/Z)).$$

where Z is an actual visible depth of said pixel of interest, Zf is said depth value of said far plane, Zn is said depth value of said near plane, and e is a positive modifying coefficient.

9. The method according to claim 8 further comprising a step of performing a clipping process for a second object among said 3D objects, which lies across said far plane, to obtain data of a first portion having depth values smaller than a depth value of said far plane and data of a second portion having depth values greater than said depth value of said far plane.

10. The method according to claim 9 further comprising a step of performing a rendering process for said first portion but exempting said second portion from said rendering process.

11. The method according to claim 10 further comprising a step of outputting the resulting pixels associated with said first portion of said second object for display after said rendering process.

12. The method according to claim 8 further comprising a step of outputting said pixels of said first object not blocked by other pixels in front thereof and having a depth value greater than said depth value of said near plane for display.

13. The method according to claim 8 wherein said first object is performed with said rendering process as a whole.

14. The method according to claim 8 wherein said 3D objects are a plurality of polygons defined with primitive data.

15. A 3D-graphics processing method for processing 3D objects in a computer system, comprising steps of:
defining a visible region, said visible region having a far plane and a near plane;
performing a rendering process for a selected object which is at least partially in said visible region; and
defining a visible depth on display (Zs) of each pixel of said selected object according to the following Z-conversion formula:

$$Zs((Zf+e1)/((Zf+e1)-(Zn-e2)))*(1-((Zn-e2)/Z)),$$

where Z is an actual visible depth of the pixel of interest, Zf is a depth value of said far plane, Zn is a depth value of said near plane, e1 and e2 are modifying coefficients, and e1 and e2 are not equal to zero at the same time.

16. The 3D-graphics processing method according to claim 15 wherein e1=0 and e2>0; e1>0 and e2=0; or e1>0 and e2>0.

* * * * *